United States Patent Office 3,316,416
Patented Apr. 25, 1967

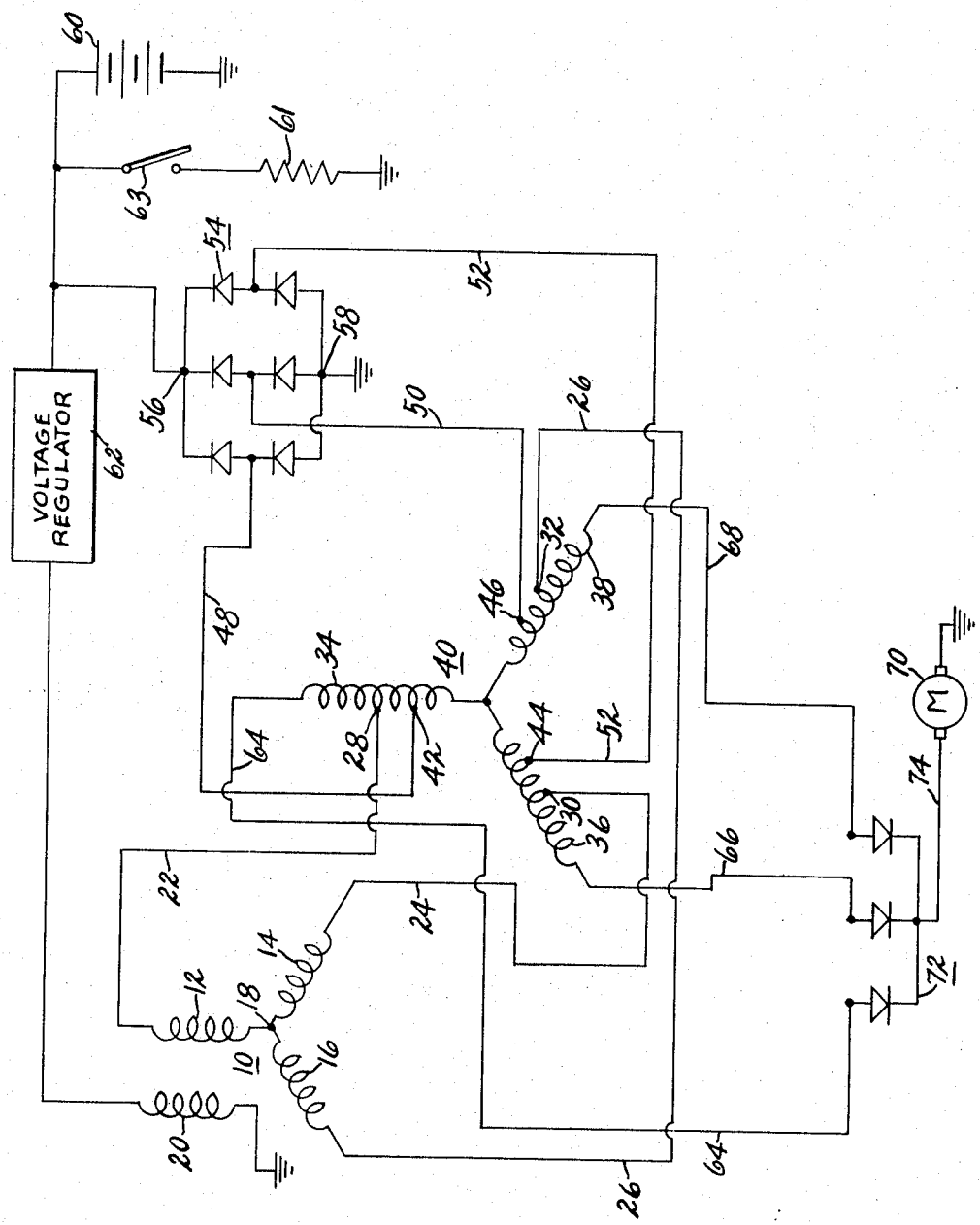

3,316,416
VEHICLE ELECTRICAL SYSTEM
Richard A. Carlson, Pontiac, Mich., assignor to General Motors Corporation, Detroit, Mich., a corporation of Delaware
Filed Oct. 23, 1963, Ser. No. 318,206
4 Claims. (Cl. 307—17)

This invention relates to an electrical system for motor vehicles or marine equipment and more particularly to an electrical system that is capable of supplying a low voltage for battery charging and other low voltage loads and a higher voltage for other loads such as fan motors and pump motors all from a single generator.

One of the objects of this invention is to provide an electrical system wherein a generator supplies a transformer and wherein the transformer supplies a low voltage circuit and a higher voltage circuit on a motor vehicle.

Another object of this invention is to provide an electrical system for a motor vehicle wherein a generator supplies a transformer which in turn supplies a high and low voltage circuit and wherein the output voltage of the generator is maintained substantially constant so that both the high voltage and low voltage circuits are regulated.

Another object of this invention is to provide a motor vehicle electrical system that has a three phase generator as a power source which supplies a three phase autotransformer, the autotransformer having tapped windings which are capable of supplying the low voltage loads on a motor vehicle as well as higher voltage loads.

Still another object of this invention is to provide a motor vehicle electrical system having high voltage loads and low voltage loads wherein the high voltage loads cannot be supplied by the battery of the system so as to prevent discharging of the battery through the higher voltage loads.

Further objects and advantages of the present invention will be apparent from the following description, reference being had to the accompanying drawings wherein preferred embodiments of the present invention are clearly shown.

In the drawing:

The single figure drawing is a schematic circuit diagram of a motor vehicle electrical system made in accordance with this invention.

Referring now to the drawing, the reference numeral 10 generally designates an alternating current generator which has a three phase output winding comprised of phase windings 12, 14 and 16 which are connected together at the neutral 18. The windings 12, 14 and 16 are Y-connected but it will be appreciated that other arrangements could be used. The generator can be of any well-known type wherein the output voltage from the phase windings 12, 14 and 16 depends upon the amount of current flowing through the field winding 20 of the generator. The generator can be of a type wherein the field winding 20 is rotatable and is driven by an engine on a motor vehicle all of which is well known to those skilled in the art or could be of the brushless type.

The phase windings 12, 14 and 16 are connected with conductors 22, 24 and 26. The conductors 22, 24 and 26 are connected with tap points 28, 30 and 32 on the windings 34, 36 and 38 of a three phase Y-connected autotransformer generally designated by reference numeral 40. The windings of the autotransformer are also tapped at junctions 42, 44 and 46 and these taps are connected respectively with conductors 48, 52 and 50.

The conductors 48, 50 and 52 are connected with the A.C. input terminals of a three phase full wave bridge rectifier designated in its entirety by reference numeral 54. The bridge rectifier 54 has a positive direct current output terminal 56 and a negative direct current output terminal 58 which is grounded.

The bridge rectifier 54 feeds the low voltage loads on a motor vehicle and may have a regulated output of approximately fourteen volts. This bridge rectifier is used to charge a battery 60 on the motor vehicle and is used to supply other twelve volt loads 61 normally found on a motor vehicle through a switch 63.

The direct current output of the bridge rectifier 54 is used to supply field current for the field winding 20 of the bridge rectifier 54. This field current is regulated by a voltage regulator 62 which may be of the transistor type as shown in the patent to Hetzler, 3,098,964, or can be of any other well-known type as long as it is capable of controlling the field current in accordance with the output voltage developed by the bridge rectifier 54. The sensing circuit which senses the direct current output voltage of the bridge rectifier 54 is not illustrated since this is conventional in the art, it being understood that the voltage regulator 62 does control field current as a function of the output voltage of bridge rectifier 54.

The outer ends of the windings of the autotransformer 40 are connected with conductors 64, 66 and 68. The conductors 64, 66 and 68 can be used to supply alternating current loads on a motor vehicle or as illustrated in the drawing, can be used to supply a D.C. load which in this case is a direct current motor 70. Where the conductors 64, 66 and 68 are to supply a direct current load, three rectifiers 72 are provided which have A.C. input terminals connected respectively with conductors 64, 66 and 68. It is seen that the positive D.C. output terminal of the rectifiers 72 is connected with conductor 74 which feeds the motor 70. The ground return for rectifiers 72 is through junction 58 and the three grounded rectifiers of bridge rectifier 54.

In the operation of this system, it will be appreciated that the autotransformer 40 is supplied with an A.C. voltage from the three phase output winding of the generator 10. The taps of the winding of the autotransformer are made such that a lower voltage is provided on conductors 48, 50 and 52 as compared to the voltage provided on conductors 64, 66 and 68. The voltages are such that the output voltage of bridge rectifier 54 is in the neighborhood of 12 to 14 volts whereas the output voltage of rectifiers 72 is in the neighborhood of 48 volts. With the arrangement just described, the bridge rectifier 54 can supply the low voltage loads found on a motor vehicle such as the storage battery whereas the rectifiers 72 can supply higher voltage loads which may be motors for driving fans, pumps and blowers which are found on motor buses. It will be appreciated that the output voltage of bridge rectifier 54 and the output voltage of rectifiers 72 is regulated by the voltage regulator 62.

It is to be noted that the conductors 64, 66 and 68 could be used to supply high voltage A.C. loads rather than high voltage D.C. loads. Thus, magnetic amplifiers could be used in place of the rectifiers 72 where it is desired to supply A.C. loads rather than D.C. loads. It is also contemplated that silicon controlled rectifiers could be used in place of the rectifiers 72 to supply an A.C. load such as an alternating current motor.

While the embodiments of the present invention as herein disclosed, constitute a preferred form, it is to be understood that other forms might be adopted.

What is claimed is as follows:

1. An electrical system for a motor vehicle comprising an alternating current generator having a three phase output winding and a field winding, a three phase autotransformer, means connecting the input terminals of said autotransformer with said three phase output winding of said generator, a three phase low voltage output circuit connected with said autotransformer, a three phase higher voltage output circuit connected with said autotransformer, a three phase full wave bridge rectifier connected with said three phase low voltage output circuit, a battery connected with the output terminals of said bridge rectifier, a rectifier network connected with said higher voltage output circuit, an electrical load energized by said rectifier network, and means connecting the field winding of said generator with the output terminals of said bridge rectifier including voltage regulating means.

2. An electrical system for a motor vehicle comprising, an alternating current generator having an output winding and a field winding, an autotransformer energized from the output winding of said generator, a low voltage output circuit fed by said autotransformer, a higher voltage output circuit fed by said autotransformer, rectifier means connected with said low voltage output circuit, said rectifier means supplying direct current to electrical loads on said motor vehicle, means electrically connecting the output of said rectifier means with said field winding, and a load energized by said higher voltage output circuit.

3. An electrical system for a motor vehicle comprising, an alternating current generator having a three phase output winding and a field winding, an autotransformer energized from said three phase winding of said generator, a low voltage output circuit fed by said autotransformer, a higher voltage output circuit fed by said autotransformer, rectifier means connected with said low voltage output circuit, said rectifier means supplying direct current to electrical loads on said motor vehicle, means electrically connecting the output of said rectifier means with said field winding, and a load energized by said higher voltage output circuit.

4. An electrical system for a motor vehicle comprising, an alternating current generator having an output winding and a field winding, the output voltage of said generator being determined by the amount of field current supplied to said field winding, a transformer having an input circuit connected to the output winding of said alternating current generator and having at least two output circuits one of which is a low voltage output circuit and the other of which is a higher voltage output circuit, a storage battery, rectifier means having A.C. input terminals connected with said low voltage output circuit of said transformer and having direct current output terminals, means connecting said storage battery across the direct current output terminals of said rectifier means, a voltage regulating means, means connecting said voltage regulating means and said field winding in series across the direct current output terminals of said rectifier means, and an electrical load connected with said higher voltage output circuit of said transformer whereby the output voltages of said low and higher output voltage circuits of said transformer are controlled by said voltage regulating means.

References Cited by the Examiner
UNITED STATES PATENTS

| | | | |
|---|---|---|---|
| 2,231,499 | 2/1941 | Culliksen | 321—39 X |
| 2,707,240 | 4/1955 | Hoover | 307—16 X |
| 2,710,927 | 6/1955 | Moore | 322—28 |
| 2,920,261 | 1/1960 | Braun | 322—25 |
| 3,070,704 | 12/1962 | Larson | 307—16 X |
| 3,219,903 | 11/1965 | Larson | 320—61 X |

ORIS L. RADER, *Primary Examiner.*

T. J. MADDEN, *Assistant Examiner.*